United States Patent
Ono et al.

(10) Patent No.: US 9,912,429 B2
(45) Date of Patent: Mar. 6, 2018

(54) TRANSMISSION DEVICE AND TRANSMISSION SYSTEM FOR TRANSMITTING AND RECEIVING TIME DIVISION MULTIPLEXING SIGNAL IN OPTICAL TRANSPORT NETWORK

(71) Applicant: FUJITSU LIMITED, Kawasaki-shi, Kanagawa (JP)

(72) Inventors: Masayuki Ono, Kawasaki (JP); Yasuyuki Mitsumori, Kawasaki (JP); Kanta Yamamoto, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 14/451,497

(22) Filed: Aug. 5, 2014

(65) Prior Publication Data
US 2015/0063817 A1    Mar. 5, 2015

(30) Foreign Application Priority Data

Sep. 2, 2013 (JP) ................................ 2013-181618

(51) Int. Cl.
*H04J 3/16* (2006.01)
*H04J 3/14* (2006.01)

(52) U.S. Cl.
CPC .............. *H04J 3/1658* (2013.01); *H04J 3/14* (2013.01); *H04J 3/167* (2013.01)

(58) Field of Classification Search
CPC ........ H04J 3/085; H04J 3/1652; H04J 3/0623; H04J 3/167; H04J 3/14; H04L 12/4641; H04L 12/422
See application file for complete search history.

(56) References Cited

U.S. PATENT DOCUMENTS

| | | | |
|---|---|---|---|
| 2001/0050914 A1 | 12/2001 | Akahane et al. | |
| 2002/0181493 A1* | 12/2002 | Bamba | H04J 3/1611 370/463 |
| 2003/0189925 A1* | 10/2003 | Wellbaum | H04J 3/1611 370/372 |

(Continued)

FOREIGN PATENT DOCUMENTS

| JP | 2001-345864 | 12/2001 |
|---|---|---|
| JP | 2008-506321 | 2/2008 |

(Continued)

OTHER PUBLICATIONS

Hashiguchi et al., "Design of OTN-Level Shared Mesh Restoration on WDM Networks", Mar. 4-7, 2013, IEEE, pp. 298-305.*

(Continued)

*Primary Examiner* — Salvador E Rivas
(74) *Attorney, Agent, or Firm* — Staas & Halsey LLP

(57) ABSTRACT

A transmission device includes: a signal receiving part configured to receive a time division multiplexing signal in which a plurality of packets are stored; a separating part configured to separate the plurality of packets from the time division multiplexing signal; an assigning part configured to assign an identifier corresponding to a stored position in the time division multiplexing signal to each of the plurality of packets; and a packet transmitting part configured to transmit at least two packets having different identifiers out of the plurality of packets through a common transmission path.

4 Claims, 7 Drawing Sheets

(56) References Cited

U.S. PATENT DOCUMENTS

| | | | |
|---|---|---|---|
| 2004/0146058 A1* | 7/2004 | Nemoto | H04J 3/1617 370/401 |
| 2007/0104485 A1* | 5/2007 | Zhang | H04J 14/0241 398/69 |
| 2012/0002965 A1 | 1/2012 | Bellato et al. | |
| 2013/0071117 A1* | 3/2013 | Pan | H04J 3/12 398/45 |

FOREIGN PATENT DOCUMENTS

| | | |
|---|---|---|
| JP | 2011-176750 | 9/2011 |
| JP | 2012-165334 | 8/2012 |
| JP | 2012-520043 | 8/2012 |
| JP | 2013-26803 | 2/2013 |

OTHER PUBLICATIONS

Japanese Office Action dated Nov. 1, 2016 in Japanese Patent Application No. 2013-181618.

Shuji Komatsu et al., "A Study of the Optical Access Network System for the POTS over Ethernet", The Institute of Electronics, Information and Communication Engineers Technology Research Report, Japan, The Institute of Electronics, Information and Communication Engineers, 2004, vol. 104, No. 380, p. 13-16, and CS2004-812004, pp. 13-16.

J. López Vizcaíno et al., Quality of protection schemes with extended flexibility for improved energy efficiency in transport networks, Design of Reliable communication Networks (DRCN), 2103 9th International Conference on the, Mar. 2013, pp. 28-35.

Japanese Office Action dated Jul. 4, 2017 in corresponding Japanese Patent Application No. 2013-181618.

Tomohiro Hashiguchi et al. :"Cost Impact of Sharing Factor N in OTN/WDM Networks with 1:N Shared Protection," Institute of Electronics, Information and Communication Engineers 2013, synthesis convention lecture collected papers communication, Mar. 2013, p. 461.

* cited by examiner

PACKET

TIME DIVISION MULTIPLEXING SIGNAL

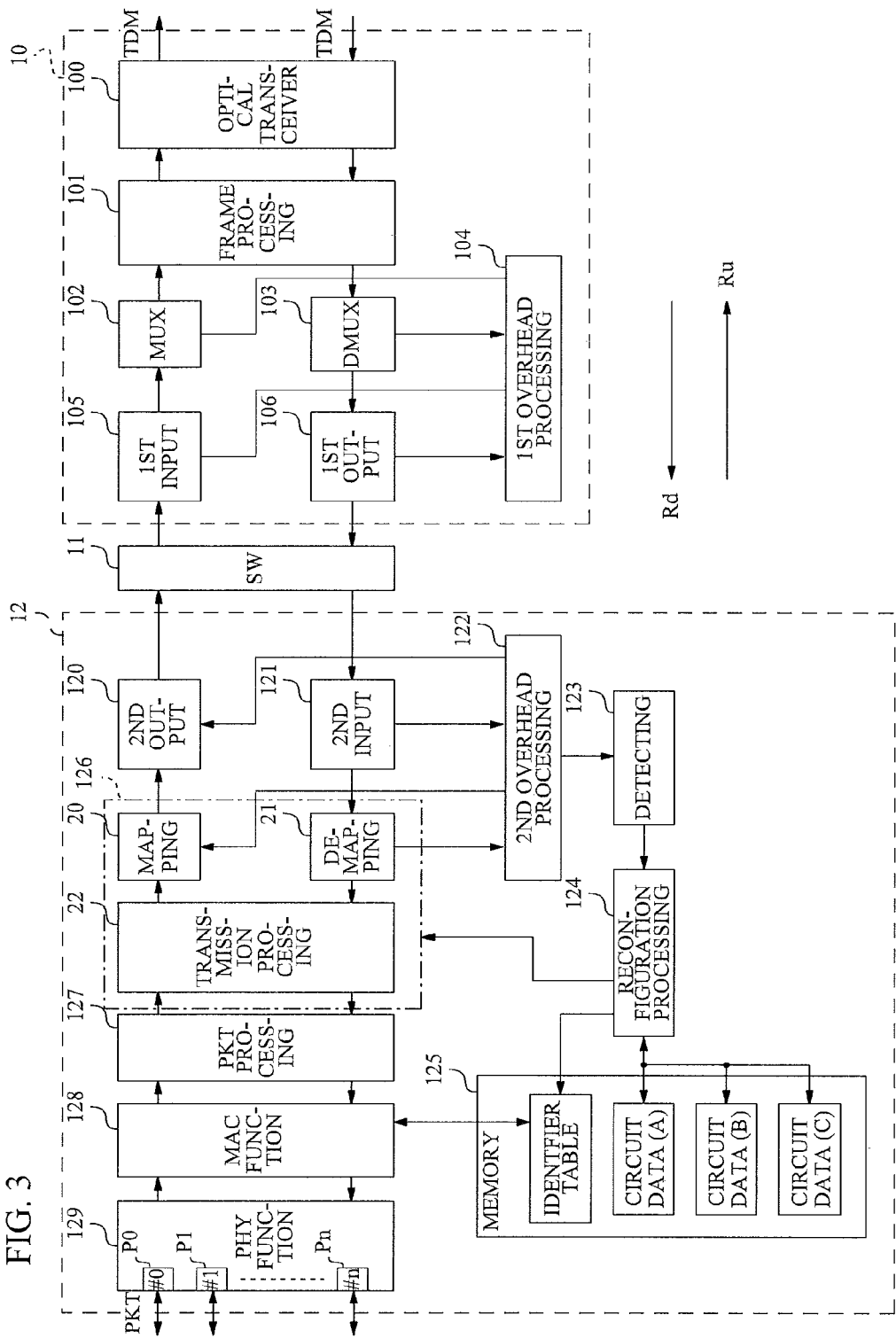

FIG. 4A

| RECEIVE VID | VALID/INVALID | TRANSMISSION SLOT NUMBER |
|---|---|---|
| 10 | 1 | 0 |
| 11 | 1 | 1 |
| (OMISSION) | | |
| 17 | 1 | 7 |
| (OMISSION) | | |
| 30 | 1 | 8 |
| 31 | 1 | 10 |
| 32 | 1 | 12 |
| 33 | 1 | 14 |
| (OMISSION) | | |
| 50 | 1 | 16 |

IDENTIFIER TABLE IN UP DIRECTION

FIG. 4B

| RECEIVE SLOT NUMBER | OUTPUT PORT NUMBER | TRANSMIT VID |
|---|---|---|
| 0 | 0 | 10 |
| 1 | 0 | 11 |
| (OMISSION) | | |
| 7 | 0 | 17 |
| 8 | 1 | 30 |
| 9 | - | - |
| (OMISSION) | | |
| 14 | 1 | 33 |
| 15 | - | - |
| 16 | 1 | 50 |
| 17 | - | - |
| (OMISSION) | | |
| 79 | - | - |

IDENTIFIER TABLE IN DOWN DIRECTION

TRANSMISSION DEVICE AND TRANSMISSION SYSTEM FOR TRANSMITTING AND RECEIVING TIME DIVISION MULTIPLEXING SIGNAL IN OPTICAL TRANSPORT NETWORK

CROSS-REFERENCE TO RELATED APPLICATION

This application is based upon and claims the benefit of priority of the prior Japanese Patent Application No. 2013-181618 filed on Sep. 2, 2013, the entire contents of which are incorporated herein by reference.

FIELD

A certain aspect of the embodiments is related to a transmission device, a transmission system and a transmission method.

BACKGROUND

With the increasing demands for communications, high-speed transport systems have been standardized. For example, ITU-T (International Telecommunication Union Telecommunication Standardization Sector) G.709 standard defines a technology of optical transport network (OTN) of approximately 1.25~100 Gbps.

In optical transmissions in OTN are implemented by mapping a plurality of client signals into an optical signal having a format called OTU (Optical channel Transport Unit), and a large capacity of transmission is thus realized. Examples of the client signals mapped into the OTU frame are the SDH (Synchronous Digital Hierarchy) frame, SONET (Synchronous Optical NET) frame, and Ethernet (registered trademark) frame. Therefore, the OTN technology is expected as a transport means having a large capacity in core networks.

When data of the client signals are multiplexed by TDM (Time Division Multiplexing) such as OTN, the data are mapped into the payload field of a time division multiplexing signal by GFP (Generic Framing Procedure), for example. As GFP, there are frame mapped GFP-F and transparent mapped GFP-T.

GFP-F performs mapping of data of the client signal for each packet or frame that forms the client signal. GFP-T performs mapping of data of the client signal by bit sampling independently of packet or frame boundaries. Thus, GFP-T enables transparent transmission of the client signal. The technologies of GFP-F and GFP-T are defined in ITU-T Recommendation G.7041/Y.1303.

GFP-T does not need synchronization processing of packets or frames, and has hardware that is less expensive than GFP-F. Thus, GFP-T is often employed in transmission devices of access networks in which extreme cost reduction has been progressing.

As to GFP, Japanese Laid-Open Patent Publication No. 2012-165334 discloses auto-negotiation enabled in mapping of the client signal by GFP-F between client devices. Japanese Laid-Open Patent Publication No. 2011-176750 discloses mapping of client signals into the OTN frame.

Since GFP-T implements the transparent transmission, the number of communication channels and the bandwidth for transmitting and receiving the client signal are set equal to the number of theoretical communication channels (tributary slots) and the bandwidth formed in the time division multiplexing signal (for example, OTU frame). For example, if 40 1 GbE (gigabit Ethernet) signals are stored in a time division multiplexing signal, 40 tributary slots each handling the 1 GbE signal are used in the interface with the client-side network.

Thus, the 40 1 GbE signals separated from the time division multiplexing signal cannot be bundled in a tributary slot of, for example, 40 Gbps of Ethernet for transmission to the client network. Thus, in order to change the communication channels in which the time division multiplexing signal is transmitted and received, it is necessary to change the communication channels in which the client signal is transmitted and received. The above change increases the cost of change and migration of the network structure.

SUMMARY

According to an aspect of the present invention, there is provided a transmission device including: a signal receiving part configured to receive a time division multiplexing signal in which a plurality of packets are stored; a separating part configured to separate the plurality of packets from the time division multiplexing signal; an assigning part configured to assign an identifier corresponding to a stored position in the time division multiplexing signal to each of the plurality of packets; and a packet transmitting part configured to transmit at least two packets having different identifiers out of the plurality of packets through a common transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram of a transmission device in accordance with an exemplary embodiment;

FIGS. 4A and 4B illustrate examples of identifier tables;

DESCRIPTION OF EMBODIMENTS

Figure 1:
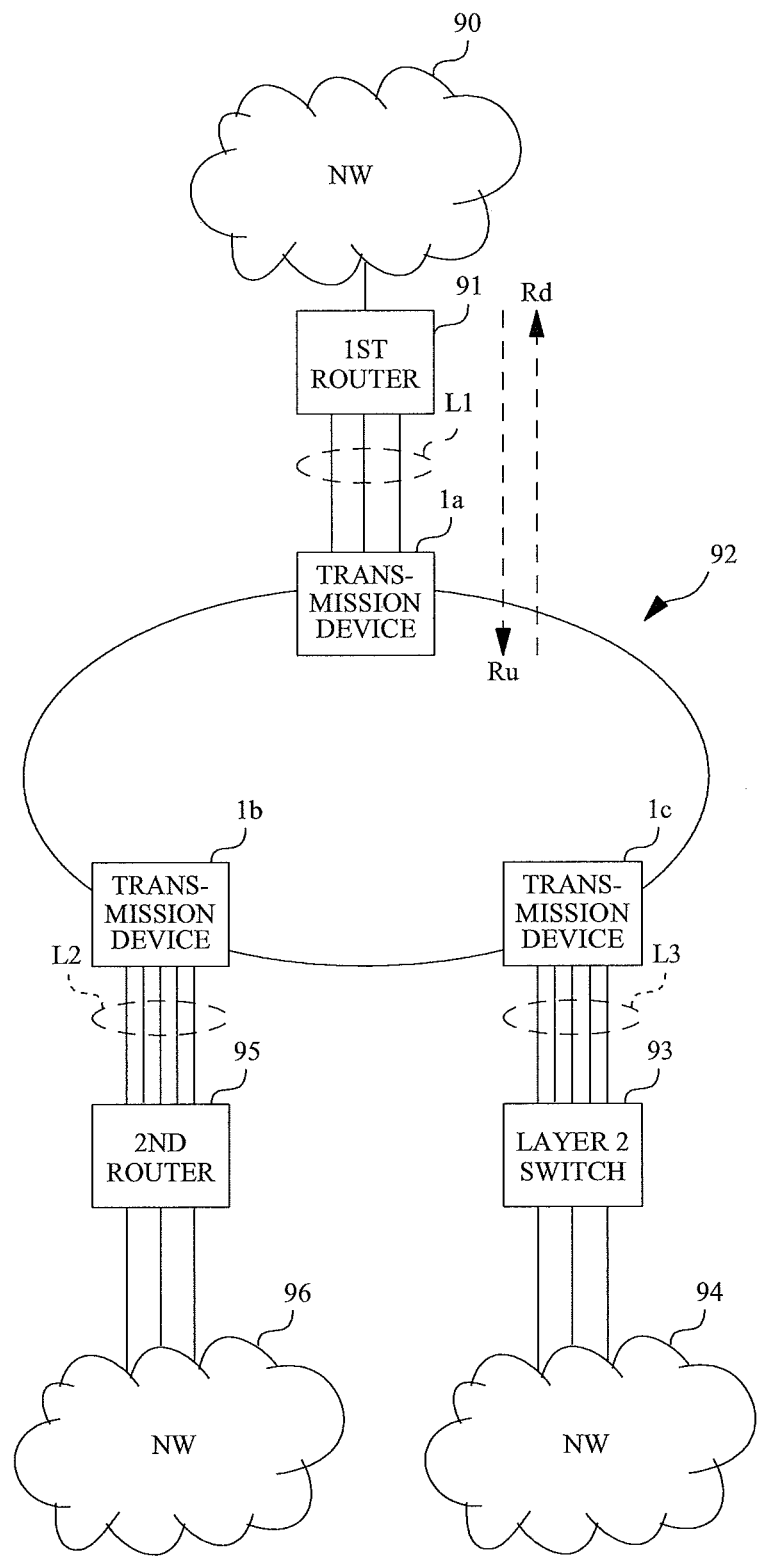
FIG. 1 is a block diagram of a structure of a network.

FIG. 1 is a diagram of a structure of a network. Transmission devices (first transmission devices) 1a~1c are connected to a metro core network 92. The metro core network 92 is not limited to a ring network in FIG. 1, but may be a mesh network.

The transmission devices 1a~1c are interconnected through transmission paths (optical fibers). The transmission device 1a is connected to a first router (second transmission device) 91 through at least one transmission path (optical fiber). The first router 91 is located at a core edge, for example, and is connected to a core network 90. The core network 90 may be configured by WDM (Wavelength Divisional Multiplexer) transmission devices connected in a closed loop configuration.

The transmission device 1a sends time division multiplexing signals (referred to hereinafter as TDM signals) to the other transmission devices 1b and 1c in the metro core network 92 and receive TDM signals therefrom. Further, the transmission device 1a sends Ethernet frames (referred to hereinafter as packets) to the first router 91 and receives packets therefrom. The transmission device 1a stores a plurality of packets in the TDM signal by GFP-T mapping, and sends the TDM signal to the transmission devices 1b and 1c in the metro core network 92. Further, the transmission device 1a receives the TDM signals from the other transmission devices 1b and 1c, separates a plurality of packets from each TDM signal, and sends the packets to the first router 91.

The transmission device 1b is connected to a second router (second transmission device) 95 through at least one transmission path (optical fiber). The second router 95 is located at a provider edge, for example, and is connected to a metro access network 96.

The transmission device 1b sends the TDM signals to the other transmission devices 1a and 1c in the metro core network 92 and receives the TDM signals therefrom. Further, the transmission device 1b sends the packages to the second router 95 and receives the packages therefrom. The transmission device 1b stores a plurality of packets in the TDM signal by GFP-T mapping, and sends the TDM signal to the other transmission devices 1a and 1c in the metro core network 92. Furthermore, the transmission device 1b receives the TDM signals from the other transmission devices 1a and 1c, separates the packages from each TDM signal, and sends the packets to the second router 95.

The transmission device 1c is connected to a Layer 2 switch (second transmission device) 93 through at least one transmission path (optical fiber). The Layer 2 switch 93 is located at a customer edge, for example, and is connected to a LAN (Local Area Network).

The transmission device 1c sends the TDM signals to the other transmission devices 1a and 1b in the metro core network 92 and receives the TDM signals therefrom. Further, the transmission device 1c sends the packages to the Layer 2 switch 93 and receives the packages therefrom. The transmission device 1c stores a plurality of packets in the TDM signal by GFP-T mapping, and sends the TDM signal to the other transmission devices 1a and 1b in the metro core network 92. Furthermore, the transmission device 1c receives the TDM signals from the other transmission devices 1a and 1b, separates the packages from each TDM signal, and sends the packets to the Layer 2 switch 93.

In the present specification, "up direction" Ru is represented as a direction of signal propagation of the transmission devices 1a-1c to the metro core network 92 from the first router 91, the second router 95 and the Layer 2 switch 93, respectively. Further, "down direction" Rd is represented as a direction of signal propagation from the metro core network 92 to the first router 91, the second router 95 and the Layer 2 switch 93. A symbol L1 indicates communication channels between the transmission device 1a and the first router 91, and a symbol L2 indicates communication channels between the transmission device 1b and the second router 95, a symbol L3 indicating communication channels between the transmission device 1c and the Layer 2 switch 93.

Figure 2A:
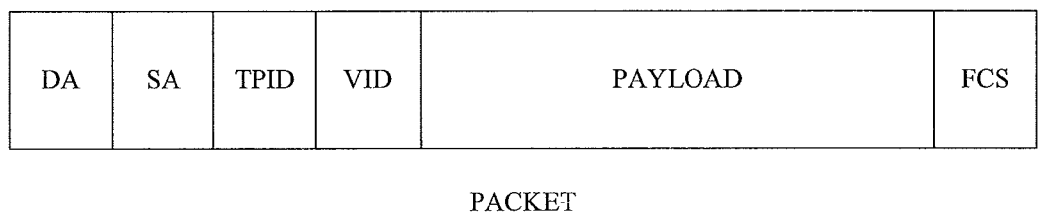
FIG. 2A is a diagram of an exemplary structure of a packet.
Figure 2B:
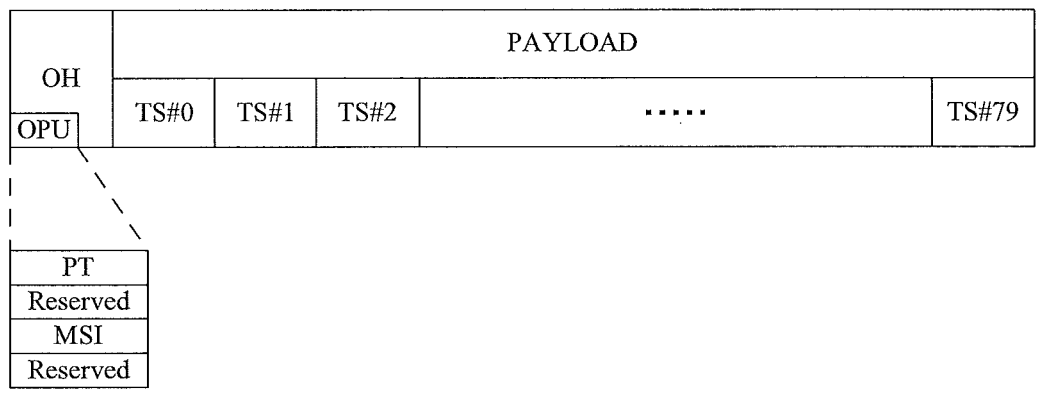
FIG. 2B is a diagram of an exemplary structure of a time division multiplexing signal.

FIG. 2A is a diagram of an exemplary structure of the packet, and FIG. 2B is a diagram of an exemplary structure of the TDM signal.

The packet includes DA (Destination Address) indicating the destination, SA (Source Address) indicating the source, TPID (Tag Protocol Identifier), VID (Virtual LAN Identifier), a payload and FCS (Frame Check Sequence). TPID is 0x8100 (hexadecimal number) (unique value) for CVLAN (Customer VLAN), and is 0x88A8 (unique value) for SVLAN (Service VLAN). However, other values may be employed in the system. FCS is a code for detecting data errors in the packet.

The TDM signal includes an overhead OH and a payload. The payload has a plurality of tributary slots TS#0~TS#79. The tributary slots TS#0~TS#79 store packets to which slot numbers #0~#79 are assigned. That is, the slot numbers indicate the positions in which the packets are stored in the TDM signal. The TDM signal as structured above is referred to hereinafter as TDM frame.

In an exemplary case where an OTU fame defined in the ITU-T Recommendation G.709 standard is used as the TDM frame, packets are stored in the tributary slots as ODUs (Optical Data Units). The number of ODUs that can be stored in the OTU frame (the number of tributary slots) is associated with the data rate of the OTU frame. For example, examples of the data rates prescribed are "ODU0" of 1.25 Gbps, "ODU2" of 10 Gbps, and "ODU3" of 40 Gbps.

The overhead of the OTU frame includes an OPU (Optical Channel Payload Unit). The OPU includes a PT (Payload Type) indicating the type of payload, MSI (Multiplex Structure Identifier), and a reserved field (Reserved). The MSI (frame information) indicates a frame structure of the OTU frame. Since the number of ODUs stored in the OTU frame is associated with the type of data rate, as described above, the MSI indicates information about the above data rate (ODUk), for example.

The transmission devices 1a~1c maps the packets into the TDM signal by GFP-T, and transparent transmission is carried out between the metro core network 92 and each of the first router 91, the second router 95 and the Layer 2 switch 93. Therefore, conventionally, the number of the communication channels L1~L3 of the transmission devices 1a~1c is equal to that of the tributary slots of the TDM signal.

The transmission devices 1a~1c of the present invention separate the packets stored in the TDM signals into the individuals, and give the packets respective VID depending on the stored positions in the TDM signal. The transmission devices 1a~1c transmit two or more packets having mutually different VIDs through the common transmission path. It is thus possible to reduce the number of communication channels L1~L3.

FIG. 3 is a block diagram of a functional structure of each of the transmission devices 1a~1c employed in the present embodiment. Each of the transmission devices 1a~1c has a first interface unit 10 that receives and transmits TDM signals (TDM in FIG. 3), a switch unit (SW) 11, and a second interface unit 12 that receives and transmits packets (PKT).

The switch unit 11 is provided between the first interface unit 10 and the second interface unit 12, and switch data on the tributary slot basis included in the TDM signal. Such data are ODU, for example. The transmission devices 1a~1c may include a plurality of first interface units 10 and a plurality of second interface units 12.

The first interface unit 10 includes an optical transceiver 100, a frame processing part (signal generating part) 101, a MUX part 102, a DMUX part 103, a first overhead processing part 104, a first input part 105, and a first output part 106. The second interface unit 12 includes a second output part 120, a second input part 121, a second overhead processing part 122, a detection part 123, a reconfiguration processing part 124, a memory (storage part) 125, a packet regenerating part 126, and a packet (PKT) processing part 127. The second interface unit 12 further includes a MAC (Media Access Control) function part (assignment part) 128, and a PHY (Physical Layer) function part 129. In the following, a separate description will be given of the functions of the above parts in the up direction Ru and those in the down direction Rd.

The PHY function part 129 includes a packet transmitting part and a packet receiving part, and transmits and receives packets to and from external communication devices such as the routers 91 and 95 and the Layer 2 switch 93. The PHY function part 129 has a plurality of ports P0~Pn respectively connected to the transmission paths and processes the packets in accordance with the function of the physical layer. The packets in the up direction Ru are input from the transmission paths via the ports P0~Pn, and are output to the MAC function part 128. The packets in the down direction Rd are input from the MAC function part 128, and are output to the transmission paths via the ports P0~Pn.

The MAC function part 128 processes the packets in accordance with the function of the MAC layer. The MAC function part 128 refers to identifier tables stored in the memory 125, and assigns a unique identifier to each packet. The MAC function part 128 assigns the slot number corresponding to VID to each packet transmitted in the up direction Ru and assigns VID corresponding to the slot number of the TDM signal to each packet transmitted in the down direction Rd.

FIGS. 4A and 4B illustrate examples of the contents of the identifier tables. More specifically, FIG. 4A illustrates the identifier table related to the up direction Ru, and FIG. 4B illustrates the identifier table related to the down direction Rd.

In the identifier table in the up direction Ru, "Receive VID" indicates VID of the packets in the up direction Ru (see FIG. 2A), and "Transmit Slot Number" indicates the slot number of the TDM signal (see FIG. 2B). "Valid/Invalid" information means that "Receive VID" and "Transmit Slot Number" are valid when this information is "1", and means that "Receive VID" and "Transmit Slot Number" are invalid when this information is "0".

When a packet in the up direction Ru is received, the MAC function part 128 searches for the transmit slot number that corresponds to the receive VID of the received packet from the identifier table. If the valid/invalid information is "1", the transmit slot number is assigned to the packet. For example, "0" is given, as a transmit slot number, to a packet having a receive VID of "10". When the valid/invalid information is "0", the assignment of the transmit slot number is not carried out.

In the identifier table in the down direction Rd, "Receive Slot Number" indicates the slot number of the slot in which the packet in the down direction Rd is stored (see FIG. 2B), and "Transmit VID" indicates VID of the packet in the down direction (see FIG. 2A). "Output Port Number" indicates the identifier numbers #0~#n of ports P0~Pn for transmission of the packets in the down direction Rd.

When a packet in the down direction Rd is received, the MAC function part 128 searches for the transmit VID that corresponds to the receive slot number of the slot in which the packet is stored from the identifier table, and assigns the transmit VID to the packet. For example, a transmit VID of "10" is assigned to the packet having a receive slot number of "0".

The MAC function part 128 searches for the output port number corresponding to the receive slot number of the slot in which the packet is stored from the identifier table, and notifies the PHY function part 129 of the output port number. The PHY function part 129 outputs the packet to the corresponding transmission path through the port having one of the the ports P0~Pn selected by the notified port number.

As will be understood from FIG. 4B, even if packets have different transmit VIDs, the packets have a common output port number. For example, packets having transmit VIDs of "10", "11" and "17" are output via port P0, and packets having transmit VIDs of "30", "33" and "50" are output via port P1.

Thus, the PHY function part 129 outputs the packets having the different VIDs to the common transmission path. The first router 91, the second router 95 and the Layer 2 switch 93, which are the destinations of the transmitted packets, are not transferred to the communication channels L1~L3 respectively provided for the transmission paths, but are transferred to the destinations corresponding to the VIDs.

Further, in the up direction Ru, the PHY function part 129 receives packets having the different VIDs via the common ports P0~Pn. That is, the PHY function part 129 receives multiple packets to which the respective VIDs are assigned through the common transmission path.

As described above, the packets are transmitted between the transmission devices 1a-1c and the first router 91, the second router 95 and the Layer 2 switch 93 through the communication channels L1-L3 corresponding to VIDs. The tables that describe the relation between the VIDs and the communication channels L1-L3 are stored in, for example, the first router 91, the second router 95 and the Layer 2 switch 93. In this case, the transmission devices 1a~1c may update the identifier tables by communicating with the first router 91, the second router 95 and the Layer 2 switch 93 via a control channel.

As described above, by storing, in the memory 125, the identifier table that indicates the correspondence relationship between the positions of the packets in the TDM signal (that is, slot numbers) and the VIDs, it is possible to easily exchange the packets between the different interfaces.

The packet (PKT) processing part 127 carries out a data rate or bandwidth control of packets. For example, a possible data rate control is a round robin in the unit of ports P0~Pn. However, the data rate control of packets is not limited to the above. The packet processing part 127 outputs the packets in the up direction Ru to the packet regenerating part 126 and outputs the packets in the down direction Rd to the MAC function part 128.

The packet regenerating part 126 has a mapping part 20, a de-mapping part 21, and a transmission processing part 22. The packet regenerating part 126 may be formed by a reconfigurable circuit such as FPGA (Field Programmable Gate Array), and is reconfigured by the reconfiguration processing part 124 in accordance with frame information included in a TDM frame in the down direction Rd, as will be described later.

The transmission processing unit 22 performs a transmission process for transparent transmission of packets as the TDM signal. The transmission processing part 22 outputs the packets in the up direction Ru to the mapping part 20, and outputs the packets in the down direction Rd to the packet processing part 127.

The mapping part 20 carries out bit sampling of packets in the up direction Ru according to GFP-T, and maps sampled data in the tributary slots #0~#79 of the TDM signal. Each packet is assigned the slot number assigned by the MAC function part 128 (that is, the transmit slot number), and is stored in the GFP-T frame corresponding to ODU.

The second overhead processing part 122 adds given control information in the overhead of the GFP-T frame. The GFP-T frame is output to the second output part 120.

The second output part 120 outputs the GFP-T frame to the switch unit 11. The second overhead processing part 122 adds other control information to the overhead of the GFP-T frame. The switch unit 11 outputs the GFP-T frame to the first interface unit 10 according to the setting of switching given by an external network management device or the like.

The second input part 121 outputs, to the de-mapping part 21, the TDM frame in the down direction Rd that is input via the switch unit 11 from the first interface unit 10. The second overhead processing part 122 obtains control information from the overhead of the TDM frame.

The de-mapping part 21 separates the packets from the TDM signal in the down direction Rd. More specifically, the de-mapping part 21 extracts the packets from the tributary slots #0~#79 of the TDM signal according to GFP-T. The packets thus extracted are output to the transmission processing part 22. The second overhead processing part 122 obtains given control information from the mapped packets.

Out of the control information that the second overhead processing part 122 obtains, the detection part (obtaining part) 123 obtains frame information on the TDM frame, that is, the frame structure of the TDM signal. The frame information is MSI (see FIG. 2B) when the OTN frame is used as the TDM frame. If the frame information has a content different from that obtained last time, in other words, if a change in the data rate of the TDM signal occurs, the detection part 123 instructs the reconfiguration processing part 124 to reconfigure the packet regenerating part 126.

When the reconfiguration processing part 124 receives the instruction of the reconfiguration from the detection part 123, the reconfiguration processing part 124 selects one of the three types of circuit data (A)~(C) stored in the memory 125 according to the frame information, and reconfigures the packet regenerating part 126 on the basis of the selected circuit data. For example, the reconfiguration processing part 124 uses a partial reconfiguration of FPGA as reconfiguration means.

The partial reconfiguration is a function of changing only a part of the circuit of FPGA. In a case where the whole second interface unit 12 is formed by FPGA, the reconfiguration processing part 124 reconfigures only the packet regenerating part 126 without affecting the other parts.

In a case where the OTU frame is used as the TDM frame, the reconfiguration processing part 124 reconfigures the transmission processing part 22 according to the data-rate information (ODUk) of the OTU frame indicated by the frame information (MSI). That is, the reconfiguration processing part 124 reconfigures the transmission processing part 22 when the data rate of the TDM signal is changed.

Figure 5A:
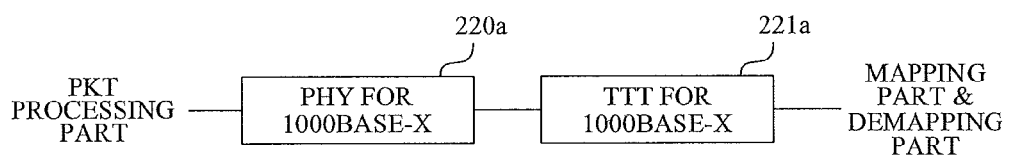
FIGS. 5A through 5C are block diagrams of exemplary structures of the transmission device.
Figure 5B:
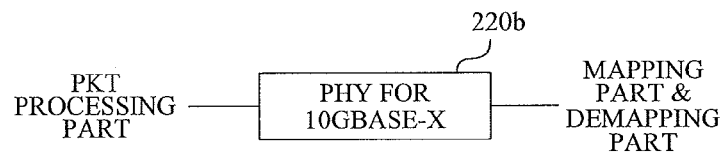
Figure 5C:
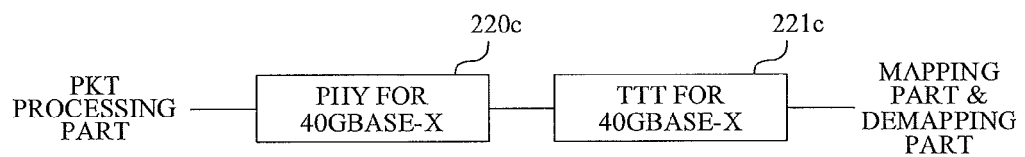

FIGS. 5A through 5C are block diagrams of exemplary configurations of the transmission processing part 22. More specifically, FIG. 5A illustrates a configuration of the transmission processing part 22 used when the data rate is ODU0 (1.25 Gbps). In this case, the transmission processing part 22 is configured by the circuit data (A), and includes a PHY part 220a for use in 1000BASE-X and TTT (Timing Transparent Transcoding) part 221a for use in 1000BASE-X. The PHY part 220a transmits the packets according to the function of the physical layer of the 1000BASE-X signal. The TTT part 221a carries out synchronous mapping of the 1000BASE-X signal into the GFP-T frame data train.

FIG. 5B illustrates a configuration of the transmission processing part 22 used when the data rate is ODU2 (10 Gbps). In this case, the transmission processing part 22 is configured by the circuit data (B), and includes a PHY part 220b for used in 10GBASE-X. The PHY part 220b transmits the packets according to the function of the physical layer of the 10GBASE-X signal.

FIG. 5C illustrates a configuration of the transmission processing part 22 used when the data rate is ODU3 (40 Gbps). In this case, the transmission processing part 22 is configured by the circuit data (C), and includes a PHY part 220c for use in 40GBASE-X, and a TTT part 221c for use in 40GBASE-X. The PHY part 220c transmits the packets according to the function of the physical layer of the 40GBASE-X signal. The TTT part 221c carries out synchronous mapping of the 40GBASE-X signal in the GFP-T frame data train.

As described above, the configuration of the transmission processing part 22 is changed according to the frame structure of the received TDM frame. This holds true for the mapping part 20 and the de-mapping part 21. Thus, the transmission devices 1a~1c have flexibility in the change of the frame structure of the TDM frame. The reconfiguration processing part 124 initializes and resets the identifier tables stored in the memory 125 when the packet regenerating part 126 is reconfigured.

In the up direction Ru, the GFP-T frame output from the switch unit 11 is input to the first input part 105 of the first interface unit 10. The first overhead processing part 104 adds the control information to the overhead of the GFP-T frame.

The MUX part 102 multiplexes the GFP-T frames and forms the multiplexed GFP-T as the payload of the TDM frame. In other words, the MUX part 102 multiplexes the packets mapped into the tributary slots #0~#79. Each packet is mapped into the tributary slot corresponding to the transmit slot number assigned by the MAC function part 128. The first overhead processing part 104 adds the aforementioned MSI to the overhead of the TDM frame.

In the up direction Ru, the frame processing part 101 generates the TDM frame, that is, the TDM signal in accordance with the payload that is input from the MUX part 102, and sends the TDM signal to the optical transceiver 100. The frame processing part 101 generates a TDM signal in which the multiple packets are stored in the positions corresponding to the VIDs.

The optical transceiver 100 is an optical module in which a light emitting element such as a laser diode and a light receiving element such as a photodiode are integrated. In the up direction Ru, the optical transceiver (signal transmitting part) 100 sends the TDM signal that is input from the frame processing part 101 to the transmission path of the metro core network 92. In the down direction Rd, the optical transceiver (signal receiving part) 100 receives the TDM signal in which the multiple packets are stored from the transmission path of the metro core network 92 and outputs the received TDM signal to the frame processing part 101.

In the down direction Rd, the frame processing part 101 carries out a synchronizing process of the TDM frame (for example, OTU frame), and outputs the TDM frame thus processed to the DMUX part 103. The DMUX part 103 separates data (for example, ODU) available for each tributary slot from the TDM signal, and outputs the data to the first output part 106. The first overhead processing part 104 obtains given information from the overhead of the TDM frame.

The first output part 106 outputs the TDM signal to the switch unit 11 for each of the separated data. The switch unit 11 outputs the TDM signal to the second interface unit 12 in accordance with the setting of switching given by the external network management device or the like. The TDM signal is input to the second input part 121 of the second interface unit 12.

According to the above-described structure, in the down direction Rd, the MAC function part 128 gives VID corresponding to the stored position in the TDM signal (slot number) to each of the multiple packets stored in the TDM signal on the basis of the identifier tables. Thus, for each packet, the theoretical communication channel (tributary slot) at the interface on the metro core network 92 side is identified by VID.

Thus, the first router 91, the second router 95 and the Layer 2 switch 93 identify the packets transmitted from the PHY function part 129 by using the VID, and are capable of transferring the packets to the destinations pointed out by the VID. That is, the first router 91, the second router 95 and the Layer 2 switch 93 are not needed to identify the packets by the individual communication channels L1~L3 through which the packets are received, that is, the individual transmission paths. Therefore, the transparent transmission of packets does not need the communication channels L1~L3 that are as many as the theoretical communication channels (tributary slots) at the interface on the metro core network 92 side.

The PHY function part 129 transmits at least two packets having different VIDs through the common transmission path. That is, the transmission devices 1a~1c statistically multiplex the multiple packets stored in the TDM signal, and transmit the multiplexed packets to the first router 91, the second router 95 and the Layer 2 switch 93 through the common transmission path. Thus, the number of communication channels L1~L3 is reduced, so that the facility and operation costs of the transmission devices 1a 1c are reduced.

The reconfiguration processing part 124 reconfigures the packet regenerating part 126 in accordance with the data rate of the TDM signal. Thus, the packet regenerating part 126 is feasible to regenerate the packets independently of the data rate of the TDM signal.

In the up direction Ru, the PHY function part 129 receives the multiple packets to which the respective VIDs are assigned via the common transmission path. The frame processing part 101 generates a TDM signal in which the multiple packets are stored in the positions (slot number) corresponding to the VIDs. The optical transceiver 100 transmits the TDM signal.

Thus, for each packet, the theoretical communication channel (tributary slot) at the interface on the metro core network 92 side is identified by VID. Thus, as has been described, the number of communication channels L1~L3 is reduced, and accordingly, the facility and operation costs of the transmission devices 1a~1c are reduced.

A description is now given of a transmission method according to an exemplary embodiment. The transmission method is carried out by using the above-described transmission devices 1a~1c.

Figure 6:
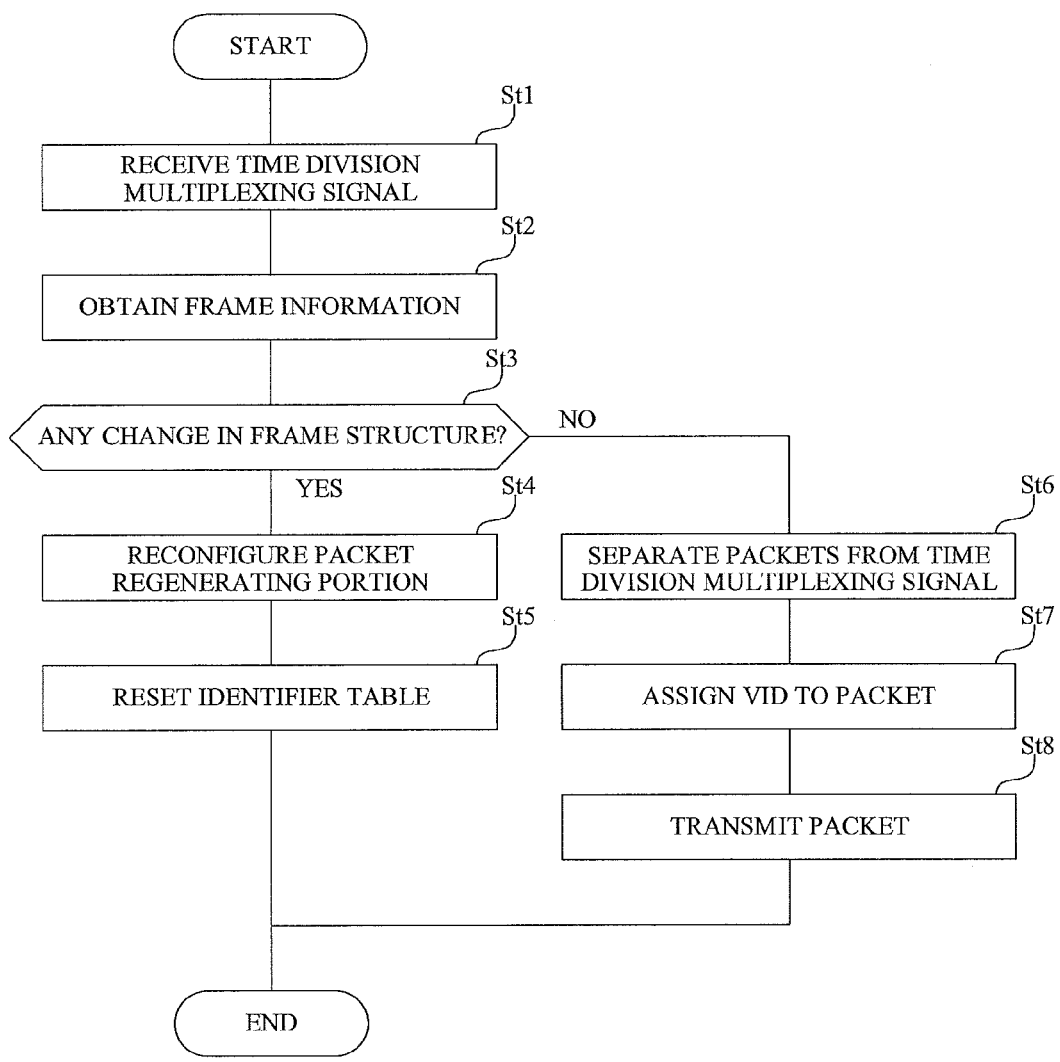
FIG. 6 is a flowchart of a transmission method in a down direction.

FIG. 6 is a flowchart of a transmission method involved in the down direction Rd. The optical transceiver 100 receives the TDM signal in which the multiple packets are stored from the transmission path of the metro core network 92 (step St1). Next, the second overhead processing part 122 obtains the frame information (for example, MSI) from the overhead of the TDM signal (step St2).

Then, the reconfiguration processing part 124 determines whether there is a change of the frame structure of the TDM signal (TDM frame) on the basis of the frame information (step St3). If there is a change of the frame structure (YES at step St3), the reconfiguration processing part 124 selects one of the circuit data (A)~(C) stored in the memory in accordance with the frame information, and reconfigures the packet regenerating part 126 in accordance with the selected circuit data (step St4).

Then, the reconfiguration processing part 124 initializes the identifier table stored in the memory 125, and reconfigures the same (Step St5). The reconfiguration is carried out on the basis of the control information obtained from, for example, the router 91, 95 or the Layer 2 switch 93.

If there is no change of the frame structure (NO at step St3), the de-mapping part 21 separates the multiple packets from the TDM signal (step St6). Thereafter, the MAC function part 128 refers to the transmit VID in the identifier table, and assigns the VID corresponding to the stored position (the tributary slot) in the TDM signal for each of the packets (step St7).

Then, the PHY function part 129 transmits the packets to the router 91, 95 or the Layer 2 switch 93 (step St8). More specifically, the PHY function part 129 refers to the output port number in the identifier table, and transmits at least two packets having the different VIDs out of the multiple packets to the common transmission path. The transmission method in the down direction Rd is carried out as described above.

Figure 7:
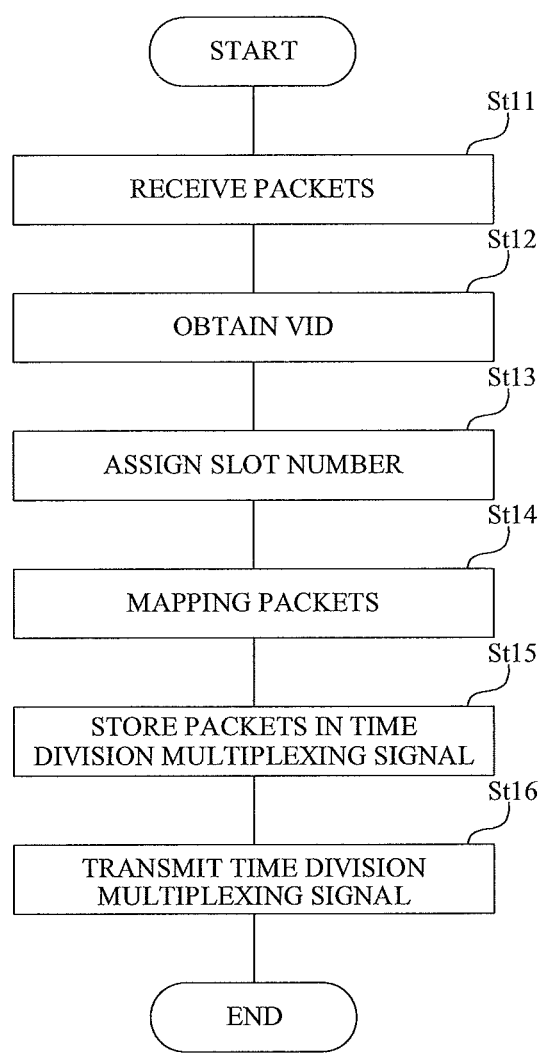
FIG. 7 is a flowchart of a transmission method in an up direction.

FIG. 7 is a flowchart of a transmission method in the up direction Ru. The PHY function part 129 receives the packets from the router 91, 95 or the Layer 2 switch 93 (step St11). More specifically, the PHY function part 129 receives the multiple packets to each of which the unique VID is given from the common the transmission path.

Next, the MAC function part 128 obtains the VID of each packet (step St12), and assigns the slot number corresponding to the VID by referring to the transmit slot number in the identifier table (step St13). Then, the mapping part 20 maps the packets into the GFP-T frame by the GFP-T method (step St14).

The, the MUX part 102 stores each packet mapped into the GFP-T frame in the tributary slot of the TDM signal corresponding to the slot number (step St15). As described above, the frame processing part 101 generates the TDM signal in which the multiple packets are stored in the tributary slots respectively corresponding to the VIDs.

Then, the optical transceiver 100 transmits the TDM signal to the transmission path of the metro core network 92 (step St16). The transmission method in the up direction Ru is carried out as described above.

As described above, each of the transmission devices 1a~1c includes the optical transceiver (signal receiving part) 100, the de-mapping part (separating part) 21, the MAC function part (assigning part) 128, and the PHY function part (packet transmitting part) 129. The optical transceiver 100 receives the time division multiplexing signal in which a plurality of packets are stored. The de-mapping part 21 separates the packets from the time division multiplexing signal. The MAC function part 128 assigns VID corresponding to the stored position in the time division multiplexing signal to each of the packets. The PHY function part 129 transmits at least two of the plurality of packets having different VIDs to the common transmission path.

According to the transmission devices 1a~1c, the MAC function part 128 gives the VID corresponding to the stored position in the TDM signal to each of the packets stored in the TDM signal by referring to the identifier table. Thus, for each packet, the theoretical communication channel (tributary slot) in the TDM signal is identified on the basis of VID. Therefore, the transparent transmission of packets does not need the communication channels L1~L3 at the PHY function part 129 side that are as many as the theoretical communication channels (tributary slots) in the TDM signal.

The PHY function part 129 transmits at least two packets having the different VIDs to the common transmission path. That is, each of the transmission devices 1a~1c statistically multiplexes the multiple packets stored in the TDM signal, and transmits the multiplexed packets to the common transmission path. Thus, the number of communication channels L1~L3 is reduced, and the facility and operation costs of the transmission devices 1a~1c are reduced.

The transmission system in accordance with the embodiment includes the first transmission devices 1a~1c interconnected through at least one transmission path and the second transmission devices (routers and Layer 2 switch) 91, 95 and 93. Each of the first transmission devices 1a~1c has the optical transceiver (signal receiving part) 100, the de-mapping part (separating part) 21, the MAC function part (assigning part) 128 and the PHY function part (packet transmitting part) 129.

The optical transceiver 100 receives the time division multiplexing signal in which the multiple packets are stored. The de-mapping part 21 separates the multiple packets from the time division multiplexing signal. The MAC function part 128 assigns, to each of the multiple packets in the time division multiplexing signal, VID (identifier) corresponding to the stored position (tributary slot) in the time division multiplexing signal. The PHY function part 129 transmits at least two packets having the different VIDs out of the multiple packets to the second transmission device 91, 95 and 93 via the common transmission path out of at least one transmission path.

The transmission system in accordance with the exemplary embodiment includes the above-described transmission devices 1a~1c and has functions and effects similar to those that have been described previously.

The transmission method in accordance with the exemplary embodiment includes the following steps (1) through (4). The first step (1) receives a time division multiplexing signal in which a plurality of packets are stored. The second step (2) separates the plurality of packets from the time division multiplexing signal. The third step (3) assigns, to each of the plurality of packets in the time division multiplexing signal, the corresponding VID (identifier) corresponding to the packet stored position (tributary slot) in the time division multiplexing signal. The fourth step (4) transmits at least two packets having different VIDs out of the plurality of packets through a common transmission path.

The transmission method in accordance with the exemplary embodiment includes the above-described transmission devices 1a~1c and has functions and effects similar to those that have been described previously.

According to another exemplary embodiment, each of the transmission devices 1a~1c includes the PHY function part (packet receiving part) 129, the frame processing part (signal generating part) 101, and the optical transceiver (signal transmitting part) 100. The PHY function part 129 receives the multiple packets to each of which the corresponding VID (identifier) is assigned through the common transmission path. The frame processing part 101 generates the time division multiplexing signal in which the multiple packets are stored in positions corresponding to the VIDs. The optical transceiver 100 transmits the time division multiplexing signal.

According to the transmission devices 1a~1c in accordance with another exemplary embodiment, the theoretical communication channel (tributary slot) at the interface on the metro core network 92 side is identified for each packet on the basis of VID. Thus, as described previously, the number of communication channels L1~L3 is reduced, and the facility cost and operation cost of the transmission devices 1a~1c are reduced.

According to another exemplary embodiment, the transmission method receives the plurality of packets to which the respective VIDs are assigned through the common transmission path, and generates and transmits the time division multiplexing signal in which the packets are stored in positions corresponding to the VIDs.

The transmission method in accordance with another exemplary embodiment includes the transmission devices 1a~1c, and has functions and effects similar to those that have been described previously.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A transmission device comprising:
    a photodiode configured to receive a time division multiplexing signal with a payload having a plurality of slots storing a plurality of packets, a first identifier indicating a position of a corresponding one of the plurality of slots in the payload being assigned to each of the plurality of packets;
    a memory having a table that indicates a relationship among the first identifier assigned to each of the plurality of packets, a second identifier indicating a theoretical communication channel to transfer each of the plurality of packets to a destination, and a port number indicating a port for transmission of the plurality of packets; and
    a Field Programmable Gate Array (FPGA) configured to
        separate the plurality of packets from the time division multiplexing signal,
        assign the second identifier corresponding to the first identifier assigned to each of the plurality of packets to each of the plurality of packets according to the table and
        transmit at least two packets having different second identifiers out of the plurality of packets through a common transmission path via a common port indicated by the port number corresponding to the different second identifiers of the at least two packets according to the table.

2. The transmission device according to claim 1, wherein the FPGA is further configured to
    obtain frame information that indicates a frame structure of the time division multiplexing signal, and reconfiguration of separating the plurality of packets in accordance with the frame information.

3. A transmission system comprising;
a first transmission device; and
a second transmission device interconnected through at least one transmission path,
the first transmission device including
a photodiode configured to receive a time division multiplexing signal with a payload having a plurality of slots storing a plurality of packets, a first identifier indicating a position of a corresponding one of the plurality of slots in the payload being assigned to each of the plurality of packets,
a memory having a table that indicates a relationship among the first identifier assigned to each of the plurality of packets, a second identifier indicating a theoretical communication channel to transfer each of the plurality of packets to a destination, and a port number indicating a port for transmission of the plurality of packets; and
a Field Programmable Gate Array (FPGA) configured to
separate the plurality of packets from the time division multiplexing signal,
assign the second identifier corresponding to the first identifier assigned to each of the plurality of packets to each of the plurality of packets according to the table and
transmit at least two packets having different second identifiers out of the plurality of packets to the second transmission device through a common transmission path among the at least one transmission path via a common port indicated by the port number corresponding to the different second identifiers of the at least two packets according to the table,
the second transmission device forwarding the at least two packets received from the first transmission device to destinations corresponding to the different second identifiers assigned to the at least two packets.

4. The transmission system according to claim 3, wherein the FPGA of the first transmission device is configured to
obtain frame information that indicates a frame structure of the time division multiplexing signal, and
perform reconfiguration of separating the plurality of packets in accordance with the frame information.

* * * * *